(12) United States Patent
Cohen et al.

(10) Patent No.: US 7,831,673 B1
(45) Date of Patent: Nov. 9, 2010

(54) METHODS AND SYSTEMS FOR PROCESSING OFFLINE CHAT MESSAGES

(75) Inventors: David Cohen, Mountain View, CA (US); Michael Davidson, Seattle, WA (US); Jonas Erik Lindberg, Seattle, WA (US)

(73) Assignee: Google Inc., Mountain View, CA (US)

( * ) Notice: Subject to any disclaimer, the term of this patent is extended or adjusted under 35 U.S.C. 154(b) by 253 days.

(21) Appl. No.: 11/980,548

(22) Filed: Oct. 31, 2007

(51) Int. Cl.
*G06F 15/16* (2006.01)

(52) U.S. Cl. ................... 709/206; 709/204; 709/205; 715/753

(58) Field of Classification Search ......... 709/204–207; 705/37
See application file for complete search history.

(56) References Cited

U.S. PATENT DOCUMENTS

| | | | |
|---|---|---|---|
| 2004/0158609 A1* | 8/2004 | Daniell et al. | 709/206 |
| 2004/0158611 A1* | 8/2004 | Daniell et al. | 709/206 |
| 2004/0186896 A1* | 9/2004 | Daniell et al. | 709/207 |
| 2005/0210113 A1* | 9/2005 | Kasuga et al. | 709/206 |
| 2006/0190546 A1* | 8/2006 | Daniell | 709/206 |
| 2006/0248157 A1* | 11/2006 | Daniell et al. | 709/207 |
| 2006/0259405 A1* | 11/2006 | Friesen et al. | 705/37 |
| 2007/0130259 A1* | 6/2007 | Daniell et al. | 709/204 |
| 2007/0174399 A1* | 7/2007 | Ogle et al. | 709/206 |
| 2007/0185961 A1* | 8/2007 | Perlow et al. | 709/206 |
| 2007/0185964 A1 | 8/2007 | Perlow et al. | |
| 2007/0186172 A1* | 8/2007 | Sego et al. | 715/753 |
| 2008/0037721 A1* | 2/2008 | Yao et al. | 379/88.11 |

* cited by examiner

*Primary Examiner*—Wing F Chan
*Assistant Examiner*—Razu A Miah
(74) *Attorney, Agent, or Firm*—Sterne, Kessler, Goldstein & Fox P.L.L.C.

(57) ABSTRACT

Systems and methods for processing offline chat messages are provided. Offline chat messages may be merged in a conversation thread in an email message. In one embodiment, a method of processing messages includes receiving a chat message when a designated recipient is offline, generating an email message that includes the chat message, and enabling a designated recipient to access the email message through an email inbox associated with the designated recipient.

20 Claims, 6 Drawing Sheets

EXAMPLE METADATA

METHODS AND SYSTEMS FOR PROCESSING OFFLINE CHAT MESSAGES

FIELD OF THE INVENTION

The present invention relates to message communication.

BACKGROUND

The emergence and development of computer networks and protocols, including the World Wide Web (or simply "the web"), now allows many remote users to communicate with one another. Different types of communication tools have been developed for the web which allow users to communicate in different ways through a browser. One popular type of communication tool is chat (also called instant messaging or IM). Chat allows users to communicate over the web in real time. A user uses a client program (called a chat client) that communicates with a chat service over the web. The chat client has a graphical user interface (GUI) that allows a user to input text and view text.

Chat communication generally involves typing text. For example, two users chatting may type lines of text in each of their chat client programs. The chat service passes the typed text between the chat clients. The lines of text may resemble a conversation in that successive lines of text are displayed in a temporal sequence along with an indication of the user who typed the text. Often this indication of the user is a display of the user's screen name (also called a chat address). Chat clients have historically had simple GUIs with rectangular window displays in which the text of a chat is made to scroll as the conversation proceeds.

Different chat services and chat client programs have different features relating to the chat experience. For example, chat services often provide presence information that indicates whether people on a user's list of contacts are currently online and available to chat. Some chat services also allow a user to set an "online status" or "away message" so that other users are aware of the user's availability to chat. Finally, users can often personalize their profiles to change graphical features associated with their chat. For instance, a user often has a screen name which is displayed to another to identify himself or herself when he or she is chatting. The screen name itself may be selected by the user (or assigned by the chat service). A user may also choose different font colors, font styles, symbols, or personalized images to be displayed along with his or her screen name. An example IM service includes the Google Talk service from Google, Inc. of Mountain View, Calif.

In existing chat services, a user often will not receive messages that are received at a chat server when he or she is offline. In such a case, the user that transmitted the message may get a response indicating that the intended recipient is offline and will not receive the transmitted message. For the intended recipient, then, to receive the contents of the message, the transmitting user may have to use another means of transmitting (e.g., email). Such a process of retransmitting the contents using other transmitting means can be cumbersome and inefficient. For example, a user may have to switch from a chat application to an email application and enter content into the email application that was previously entered into the chat application.

SUMMARY

The inventors recognized that what is needed are methods and systems that allow for an intended recipient to receive chat messages when the intended recipient is offline.

Embodiments of the present invention relate to processing offline chat messages. In one embodiment, a method of processing messages includes receiving a chat message when a designated recipient is offline, generating an email message that includes the chat message, and enabling a designated recipient to access the email message through an email inbox associated with the designated recipient.

In another embodiment, a system for processing messages includes a chat module and an email module configured to enable a designated recipient to access an email inbox. The chat module is configured to transmit information contained within a chat message that is received when the designated recipient is offline to the email module. The designated recipient can access an email message that includes the information through the email inbox.

In another embodiment, a method of processing messages includes receiving a chat message, generating an email message that includes the chat message, and enabling a designated recipient to view the generated email as an unread email in an email inbox of the designated recipient if the designated recipient is offline when the chat message is received.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS

Systems and methods for processing chat messages are provided. Offline chat messages may be merged in a conversation thread in an email message. While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The term chat, as described herein, refers broadly and inclusively to any instant messaging application, protocol, framework or service as would be apparent to a person skilled in the art given this description. An example chat service (including a chat server and/or chat client) which may be adapted to incorporate embodiments of the present invention as described herein includes, but is not limited to, the Google Talk service from Google, Inc. of Mountain View, Calif.

Chat Service

Figure 1:
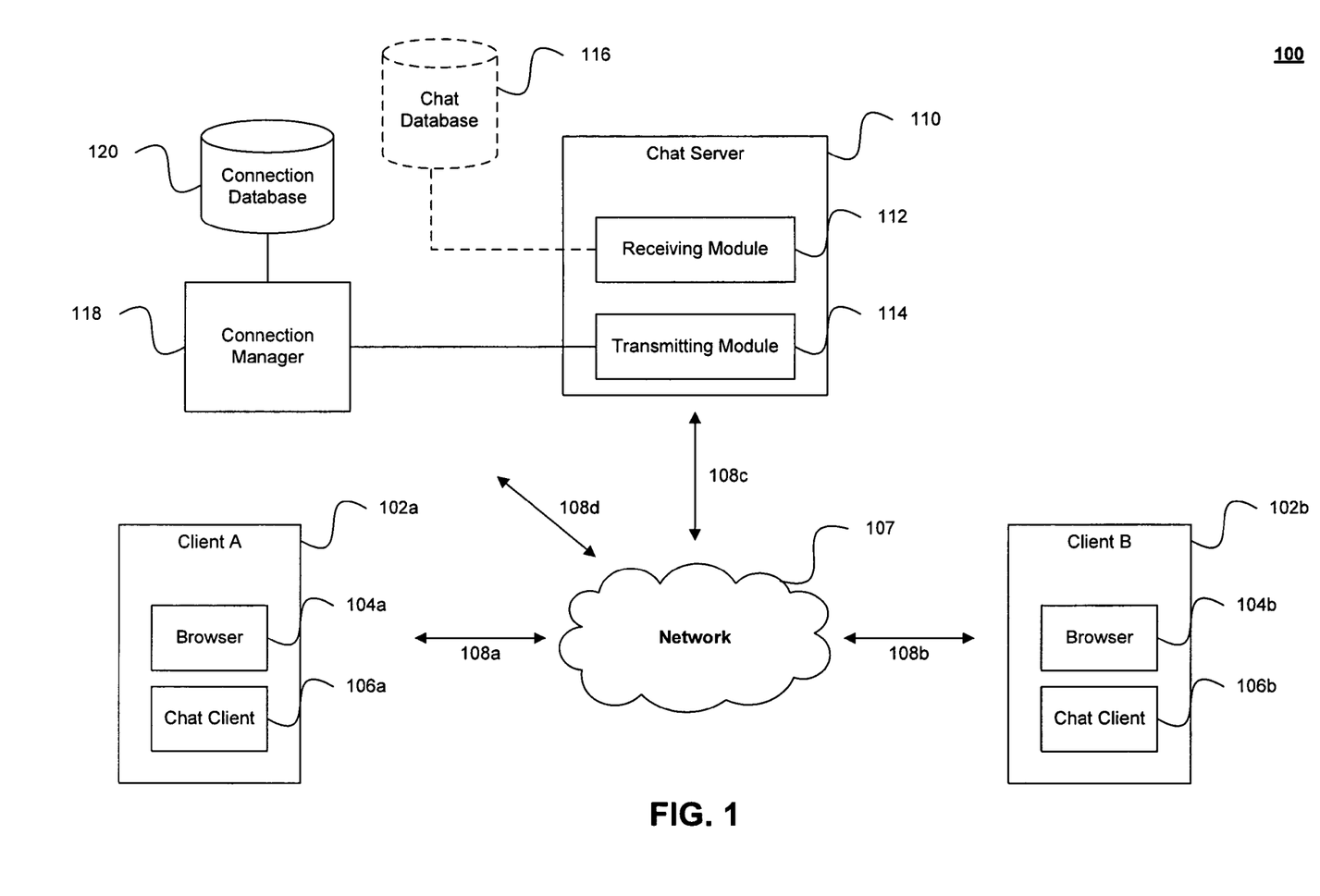
FIGS. 1 and 2 are diagrams of exemplary systems for providing chat capabilities according to an embodiment of the present invention.

FIG. 1 is a diagram of a system 100 for providing chat services, according to an embodiment of present invention. Although system 100 is described herein with reference to two users, one of skill in the art will recognize that system 100 may also be utilized in providing chat capabilities between more three or more users without departing from the spirit and scope of the present invention. System 100 includes a client A 102*a*, a client B 102*b*, a network 107, and a chat server 110. Client A and client B may be associated with a user A and a user B, respectively, by way of example, and without limitation. One or both of client A and client B may be a computer, a personal digital assistant (PDA), cellular phone, a combination thereof, or any other type of device that allows a user to connect to a network such as network 107.

Network 107 can be any network or combination of networks that can carry data communication, and may be referred to herein as a computer network. Such network 107 can include, but is not limited to, a local area network, medium area network, and/or wide area network such as the Internet. Network 107 can support protocols and technology including, but not limited to, World Wide Web protocols and/or services. Intermediate web servers, gateways, or other servers may be provided between components of system 100 depending upon a particular application or environment.

Client A includes a browser 104*a* and a chat client 106*a*. Similarly, client B includes a browser 104*b* and a chat client 106*b*. As would be apparent to those skilled in the relevant art(s), client A and client B may include additional chat clients and browsers without departing from the scope and spirit of the present invention. Browsers 104*a* and 104*b* and chat clients 106*a* and 106*b* may be installed on client A and client B, respectively, as software, hardware, firmware, or any combination thereof and may be implemented through computers, workstations, a distributed computing system, an embedded system, a stand-alone electronic device, a networked device, a mobile device, a set-top box, a television, or other type of processor or computer system. Chat clients 106*a*, 106*b* may be stand-alone applications, or can be executed within respective browsers 104*a*, 104*b* (for example, as a script within a browser, as a plug-in within a browser, or as a program which executes within a browser plug-in, such as the Adobe (Macromedia) Flash plug-in). Client A and client B are coupled to network 107 through connections 108*a* and 108*b*, respectively. Connections 108*a* and 108*b* may be wired, wireless, or a combination thereof.

Browsers 104*a* and 104*b* may enable user A and user B to access information through network 107. For example, in an embodiment in which network 107 is the Internet, browsers 104*a* and 104*b* may enable user A and user B to download websites and/or other information.

Chat server 110, includes a receiving module 112 and a transmitting module 114. Chat server 110 is coupled to network 107 through a network connection 108*c*. Network connection 108*c* may be wired, wireless, or a combination thereof. In an embodiment, chat server 110, along with chat clients installed on client devices coupled to network 107 enables users to chat over network 107. In a further embodiment, chat server 110 may utilize various other networked components to support communication. For example, chat server 110 along with chat clients 106*a* and 106*b* may enable chat messages to be exchanged between user A using client A, and user B using client B.

To enable chatting between user A and user B, user A and user B must be logged onto a chat service provided by chat server 110 through chat clients 106*a* and 106*b*, respectively. In logging into the chat service, chat clients 106*a* and 106*b* transmit information to chat server 110. Such information may include, by way of example and without limitation, a screen or user name identifying a user (e.g., identifying user A), a password, a network address of a device on which the chat client is installed (e.g., the network address of client A), a port on a device, and/or other information that is requested by chat server 110 or is otherwise used to enable a chat. Chat clients 106*a* and 106*b* also, implicitly or explicitly, inform chat server 110 that user A and user B are available to chat. Chat clients 106*a* and 106*b* receive information about other users (e.g., associated network addresses, screen or user names, etc.). For example, in logging onto the chat service provided by chat server 110, chat client 106*a* may transmit a screen name associated with user A and a network address associated with client A. Chat client 106*a* may receive the network address associated with client B and a user name associated with user B. User A is then said to be logged into the chat service. Chat client 106*a* displays or otherwise indicates through client A whether user B is available to chat.

Information exchanged as clients log onto the chat service provided by chat server 110 regarding network connections may be managed by a connection manager 118. Connection manager 118 is coupled to network 107 through network connection 108*d*. Connection manager 118 may store network information in connection database 120. For example, connection database 120 may include a plurality of entries. Each entry may be associated with a user currently logged onto the chat. Each entry may store a network address associated with the user as well as other information. In a further embodiment, the connection manager 118 may also track a status of each user. For example, connection manager 118 may update each entry of connection database 120 with a status indicating whether the user remains logged on, a time period during which the user has been inactive, etc. In an embodiment, a user is considered inactive if he or she has not participated in chat activities for a predefined length of time.

Receiving module 112 is configured to receive chat messages. As shown in FIG. 1, receiving module 112 is optionally coupled to a chat database 116. In such an embodiment, a copy of the received chat message along with associated metadata (e.g., a network address of a designated recipient, time of reception, etc.) may be stored in chat database 116. In a further embodiment, a portion or all of the contents of chat database 116 may be accessed through network 107. For example, user A may view the contents of chat database 116 through client A that is coupled to network 107. In a further embodiment, user A may view contents of chat database 116 through browser 104*a*. Access may be restricted by requiring a user (through a client device) to transmit a screen name, user name, and/or password.

Transmitting module 112 is configured to transmit received messages to a designated recipient. A designated recipient may be a user to which the chat message is to be transmitted. A chat message may have more than one designated recipients.

Before transmitting the chat message, transmitting module 114 queries a connection manager 118 to determine information regarding the designated recipient. For example, transmitting module 114 may query connection manager 118 for a network address associated with the designated recipient and whether the designated recipient remains logged onto the chat service. Once the desired information is obtained from connection manager 118, the chat message is transmitted to the chat client associated with the designated recipient. In alternative embodiments, network information regarding a designated recipient may be acquired in other ways, with or without connection manager 118, without departing from the scope and spirit of the present invention.

For example, and without limitation, user A using client A may desire to send a chat message to user B using client B. Client A and client B are coupled to network 107 through connections 108a and 108b, respectively. User A and user B are logged onto a chat service provided by chat server 110 through chat clients 106a and 106b, respectively. Connection manager 118 receives information related to both user A and user B and creates corresponding entries in connection database 120. The corresponding entries may store network addresses of clients A and B, a bandwidth of connections 108a and 108b, and/or other information. The chat message is transmitted by chat client 106a and received by receiving module 112. Receiving module 112 optionally stores a copy of the chat message in chat database 116. Transmitting module 114 queries connection manager 118 for information related to user B and whether user B remains logged on. Upon finding out that user B remains logged on and acquiring necessary network information, transmitting module 114 transmits the chat message to chat client 106b. Chat client 106b may display the chat message on client B.

Chat Log Off and Access to Offline Chat Messages Through Email

In the embodiment described above, user B, e.g., the designated recipient, remained logged onto the chat service as the chat message was being transmitted to chat client 106b. In alternate embodiments, user B may log off of the chat service before the chat message is received at chat client 106b. In such an embodiment, either through communication protocols implemented in network 107 or connection manager 118, chat server 110 may find out that user B has logged off and will not receive the message. In the embodiment in which chat database 116 stores all chat messages received by chat server 110, user B may access the chat message through appropriate interaction with chat database 116, as described above. However, since chat database 116 may store large numbers of chat conversations involving user B, user B may not wish to access chat database 116 frequently. Thus, the chat message may not actually be presented to user B for a significant period of time. In embodiments described herein, however, chat messages received while the designated recipient is offline may be accessed through an email inbox.

A user may be considered offline if the user has logged off a chat service, a network connection associated with the user has been terminated, the user is considered inactive, or is otherwise unlikely to read a received chat message. For example, user B may be considered inactive when user B fails to engage in chat activities over a predefined length of time. In alternate embodiments, a user may be classified as offline according to other criteria. A chat message that specifies user B as a designated recipient that is received while user B is offline may be made available to user B through an email inbox associated with user B.

Figure 2:
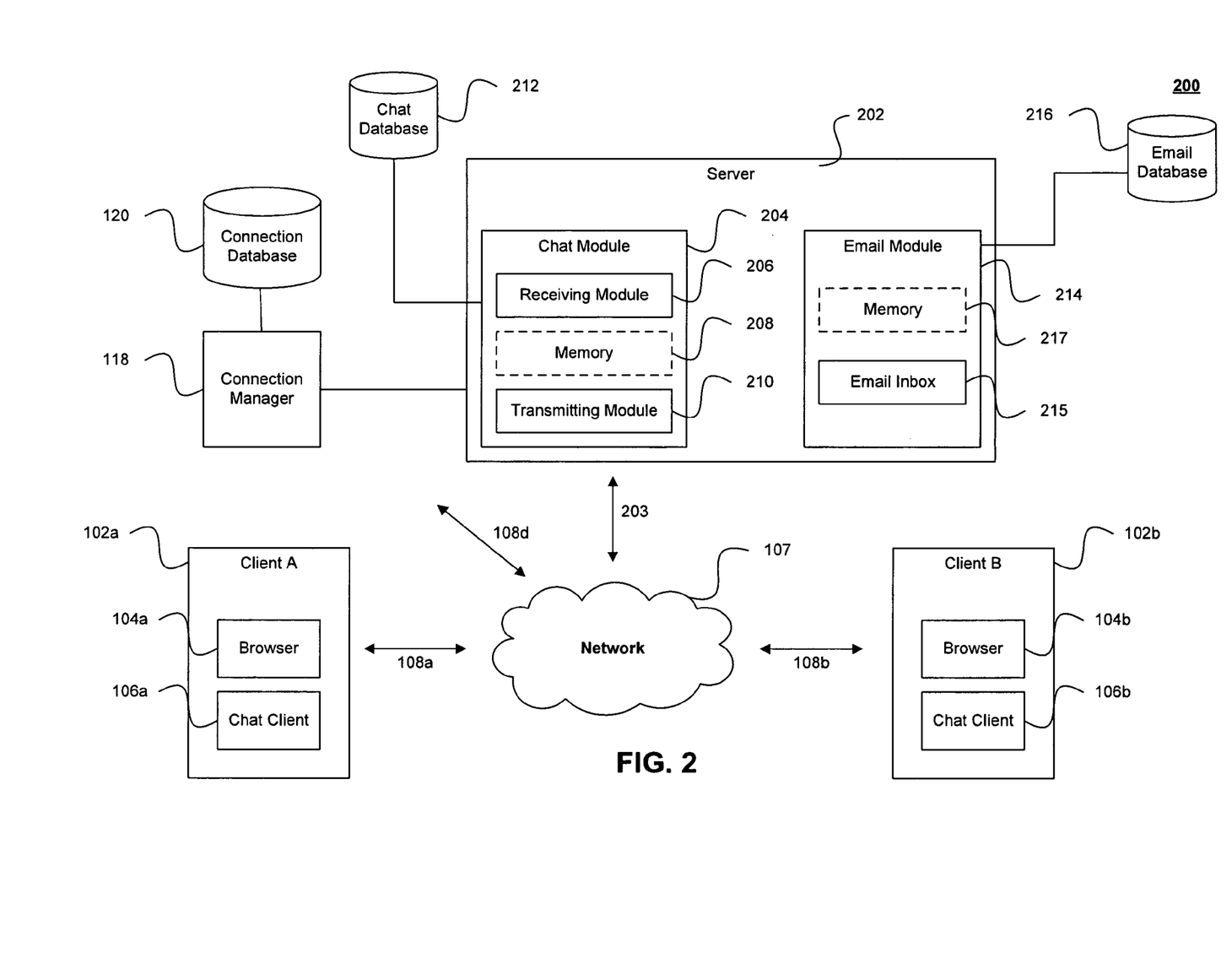

FIG. 2 shows a system 200 for providing chat services, according to an embodiment of the present invention. System 200 includes client A 102a, client B 102b and a server 202 coupled to network 107 through network connections 108a, 108b, and 203, respectively. Client A and client B may be associated with user A and user B as described with reference to FIG. 1. Network connection 203, similar to network connection 108c, may be wired, wireless, or a combination thereof.

Server 202 includes a chat module 204 coupled to a chat database 212 and to connection manager 118 and an email module 214 coupled to an email database 216. Chat module 204 includes a receiving module 206 and a transmitting module 210 and optionally includes a memory 208. Email module 214 includes an email inbox 215 and optionally includes a memory 217. Connection manager 118 is coupled to connection database 120.

Chat module 204 is configured to transmit information contained within chat messages that are received when a designated recipient is offline, i.e., offline chat messages, to email module 214. Email module 214 is configured to allow users to access email inboxes. For example, email inbox 214 may allow the designated recipient to access an email inbox associated with him or her. Through such an email inbox, the designated recipient may access an email that contains information included in a received offline chat message as well as other chat messages and other email messages. Receiving module 206 and transmitting module 210 are generally similar to receiving module 112 and transmitting module 114, respectively, described with reference to FIG. 1.

Optional memories 208 and 217 are configured to hold generated emails. For example, in an embodiment, chat module 204 is configured to generate emails that include received chat messages. In such an embodiment, memory 208 may be configured to hold the generated emails. In an alternate embodiment, chat module 204 is configured transmit received chat messages to email module 214. Email module 214 may generate the email message that contains the received chat message. In such an embodiment, the generated chat message may be held in memory 217.

As would be appreciated by those skilled in the relevant art(s), each of the elements of system 200 may be implemented as a server or otherwise as hardware, software, firmware, or any combination thereof. Each element of system 200 may be coupled to other elements of system 200 through the use of a communication network such as the Internet. For example, chat module 204 is shown conceptually to include receiving module 206, memory 208, and transmitting module 210 in a single unit. However, each of receiving module 206, memory 208, and transmitting module 210 may be implemented a separate server and coupled together through the Internet or other communication network. Additionally or alternatively, other elements such as email module 214 may be implemented as a separate server and coupled to other elements of server 202 through the Internet or other communication network.

The operation of system 200 will be discussed in greater detail with respect to method 300 presented in FIG. 3 and described below.

Figure 3:
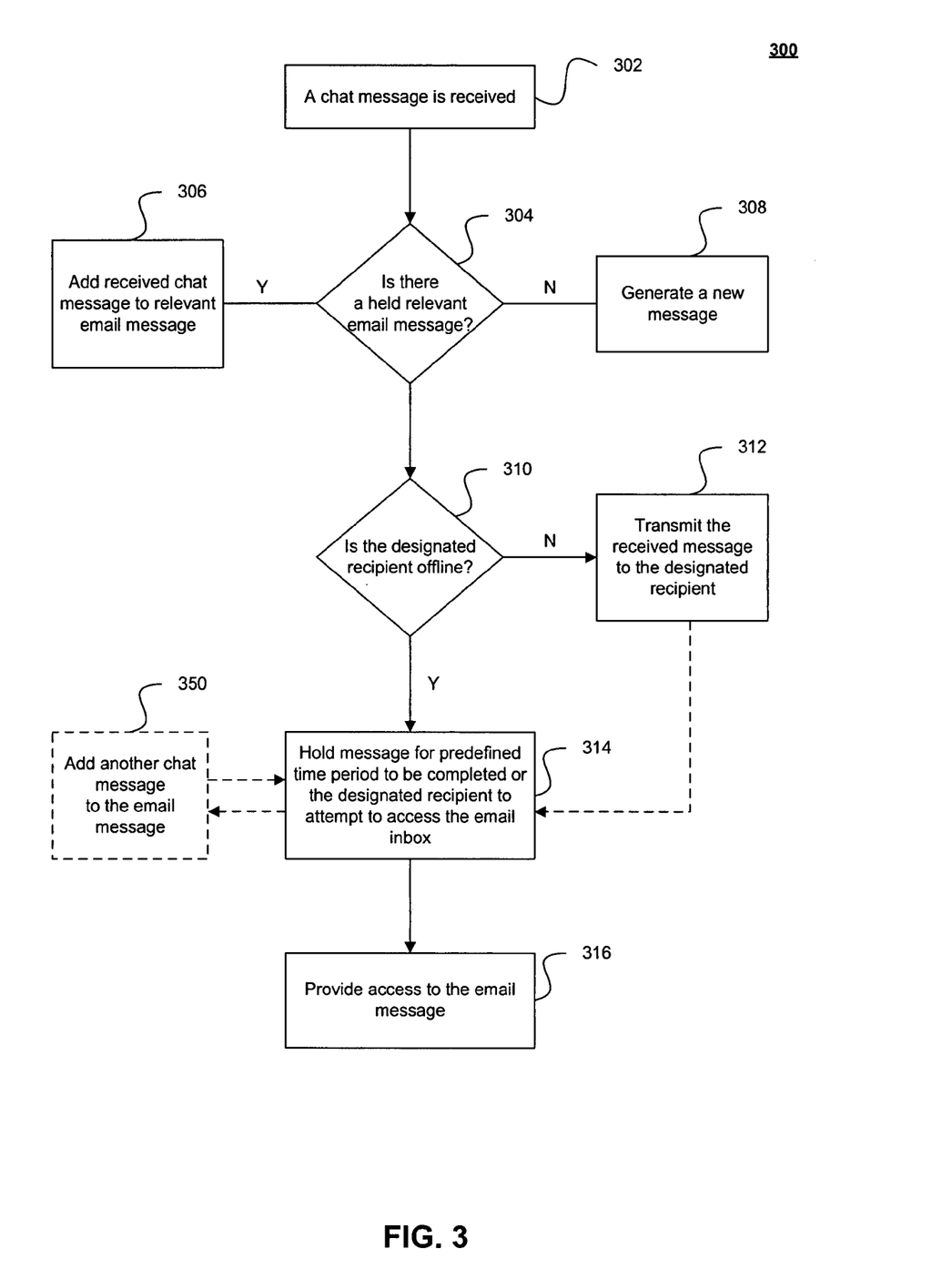
FIG. 3 is a flowchart illustrating an exemplary method for processing messages according to an embodiment of the present invention.

FIG. 3 shows an exemplary method 300 for processing messages, according to an embodiment of the present invention. As would be apparent to those skilled in the relevant art(s), such a method may be automated through the use of hardware, software, firmware, or any combination thereof. Method 300 will be described with reference to an embodiment in which a user A chats with a user B through system 200 shown in FIG. 2, but as would be appreciated by those skilled in the relevant art(s), method 300 may be applied to other scenarios. For example, portions of method 300 may be applied to a chat between three or more parties.

Figure 4:
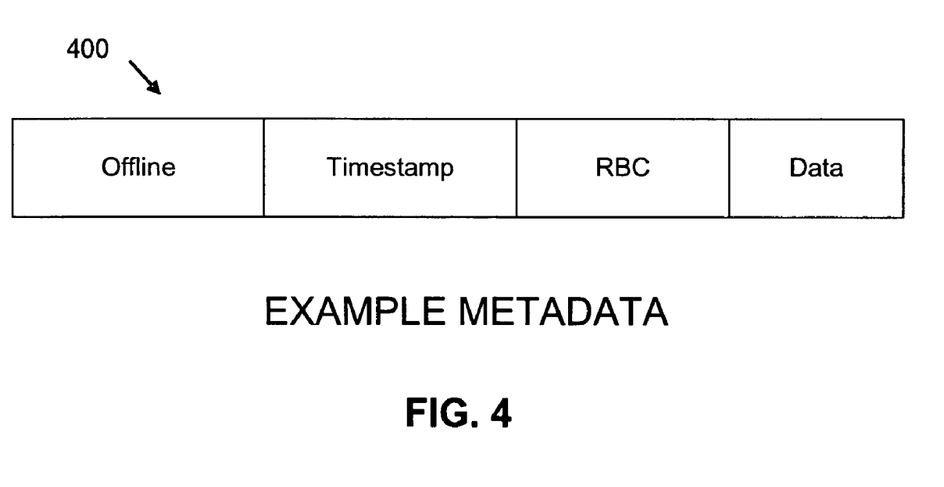
FIG. 4 is a diagram of an exemplary metadata portion according to an embodiment of the present invention.

Method 300 begins with step 302. In step 302, a chat message is received. For example, in FIG. 2, a chat message transmitted by a user A using chat client 106a may be received by receiving module 206. In an embodiment, the received chat message includes metadata 400 shown in FIG. 4. As shown in FIG. 4, example metadata 400 includes an offline indication, a timestamp, a reply-by-chat (RBC) field, and data. The offline indication may indicate whether the designated recipient is offline. For example, the offline indication may include a binary field. A first value may indicate that the designated recipient is offline and a second value may indicate that the designated recipient is online. The timestamp may indicate a time at which chat client 106a transmitted the chat message or a time at which the chat message was received at server 202 or chat module 204. The RBC field may indicate whether the message is a reply to a message that is not a chat message. For example, the RBC field may indicate that the chat message is a reply to an email message. The data may include the data that will be presented to user B (e.g., the text of the message) as well as other information to be transmitted (e.g., network address of user B).

In step 304, it is determined whether there is a held relevant email message. For example, in FIG. 2, chat module 204 may query memory 208 and/or memory 217 to determine whether there is a relevant email message being held. For example, and without limitation, in the embodiment that chat module 204 is configured to generate email messages corresponding to received chat messages, chat module 204 may query memory 208 to determine if a relevant email message is being held. Alternatively, in the embodiment in which chat module 204 is configured to transmit received chat messages to email module 214, chat module 204 may instead query email module 214. Email module 214, then, may query memory 217 to determine if a relevant email message being held.

In an embodiment, a relevant email message is an email message that includes a chat message that is associated with the received chat message. For example, and without limitation, user A and user B may be chatting for an extended period of time. During that time, an email message may have been generated that includes one or more chat messages exchanged during the chatting session. If the received chat message is part of that chatting session, the email may be considered relevant.

An email message may be termed to include a chat message if the email message includes contents of the chat message such as metadata or information to be presented to the designated recipient (e.g., text, images, video, audio, multimedia, etc.).

If it is determined that there is a relevant email message being held, step 306 is reached. In step 306, the received chat message is added to the relevant email message. In adding the received chat message to the relevant email message, contents of the received chat message (e.g., metadata, information to be presented to the designated recipient, etc.) may be added to the relevant email message. For example, in FIG. 2, the received chat message may be added to the relevant email message held in memory 208 or memory 217 by chat module 204 or email module 214.

The received chat message may be added to an email message that contains chat messages received while the designated user is online. Thus, a single email message may include chat messages received while the designated recipient is online and offline. In alternate embodiments, separate emails may be generated for chat messages received while the designated recipient is online and offline.

Alternatively, if it is determined that there is not a held relevant email message, step 308 is reached. In step 308, a new message is generated. The new message includes the received chat message. For example, in FIG. 2, chat module 204 may generate a new email message that includes the received chat message. The new email message may be held in memory 208. Alternatively, chat module 204 may transmit the received chat message to email module 214. Email module 214 may generate the new email message and store the new email message in memory 217.

In embodiments described herein, email messages may be generated for a received chat message whether or not the chat message is received when the designated recipient is offline. In other words, a new email message may be generated regardless of whether the chat message received in step 302 is received when the designated recipient is online or offline.

Thus, at the conclusion of either step 306 or 308 an email message, either held or newly generated, exists that includes the received chat message. As described below, the email message refers to either the held message (e.g., if step 306 is reached) or the newly generated message (e.g., if step 308 is reached). In an embodiment, both step 306 and 308 lead to step 310.

In step 310, it is determined whether the designated recipient of the received chat message is offline. As described above, an offline user may be a user that is inactive, logged off a chat service, has had an associated network connection terminated, or is otherwise unlikely to view the contents of the received chat message. For example, in FIG. 2, chat module 204 may query connection manager 118 to determine whether user B is offline. Connection manager 118 may, in turn, query connection database 120 to obtain the entry associated with user B. From that entry, connection manager 118 may determine whether user B is offline.

If the designated recipient is determined not to be offline, step 312 is reached. In step 312, the received chat message is transmitted to the designated recipient. For example, transmitting module 210 may transmit the received chat message to chat client 106b. As shown in FIG. 3, step 312 optionally leads to step 314.

In step 314, the email message is held for a predefined period of time or until the designated recipient attempts to access an associated email inbox. The predefined period of time may be measured from when the email message was generated or from when a chat message was added to the email message. For example, the predefined period of time may be five minutes. In such an embodiment, an email may be held for five minutes from when the email was generated or from when a chat message (e.g., the most recently received chat message) was added to the email message.

If the designated recipient attempts to access an associated email inbox, the email is then needed so it can be provided to the designated recipient. In alternate embodiments, the email may be held until the designated recipient attempts to access the email message in the email inbox.

For example, in FIG. 2, the email message may be held in memory 208 or memory 217 for a predefined period of time or until user B attempts to access email inbox 215.

In an embodiment, the email message is held so as to wait for additional chat messages that may be relevant to the email message. In optional step 350, a second received chat message is added to the email message. In an embodiment, step 350 occurs when the second received chat message is relevant to the email message and the email message is still being held. In an embodiment, chat messages are added to existing relevant email messages instead of generating new email messages corresponding to each received chat message to save space in memory 208 and/or memory 217 and/or to present the received chat messages to the designated recipient in a more convenient manner.

In an alternate embodiment, a second email message may be generated that includes the second received chat message. Such an embodiment may occur, for example and without limitation, if the second chat message is not relevant to the email message or if the first email message is not being held (e.g., the predefined period of time has elapsed or the designated recipient has attempted to access the email inbox).

As shown in FIG. 3, step 314 is reached if the designated recipient is offline and optionally is reached if online (step 312). In the embodiment that the designated recipient is online, the email message may be held to wait for additional chat messages to be added to the email message. In an embodiment, then, the email message may include chat messages that are all received when the designated recipient is online. Thus, in embodiments described herein, the email message may include only offline messages, only online messages, or a combination thereof.

For example, in FIG. 2, user A, through client 106a, may transmit a second chat message. Upon being received by receiving module 206, the second chat message may be added to the email message that includes the first received chat message.

In step 316, the designated recipient is provided access to the email message. In order to provide access to the email message, the email message may be transmitted from a location where it is being held temporarily (e.g., a memory) to a location where it will be stored indefinitely (e.g., a storage). For example, in FIG. 2, the email message may be transmitted from memory 208 or memory 217 to email database 216. The email message may be transmitted from memory 208 or memory 217 by chat module 204, email module 214, or another component of server 202. For example, email module 214 may access memory 208 to obtain the email message and transmit the message to email database 218.

The designated recipient may access the associated email inbox through appropriate interaction with a server and/or an email module of a server. For example, in FIG. 2, user B may access email inbox 215 through the use of browser 104b that interacts with server 202 and/or email module 214.

Additionally or alternatively, the email message may be transmitted to chat database 212. Such an embodiment may occur if, for example, and without limitation, the designated recipient is online to receive all the chat messages contained in the email. User B may access the email message stored in through appropriate interaction with server 202.

Figure 5A:
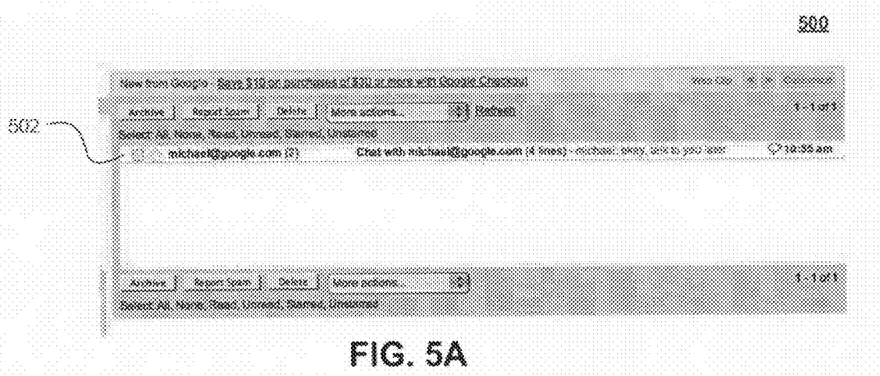
FIGS. 5A-5C show exemplary screen shots of an email inbox according to an embodiment of the present invention.
Figure 5B:
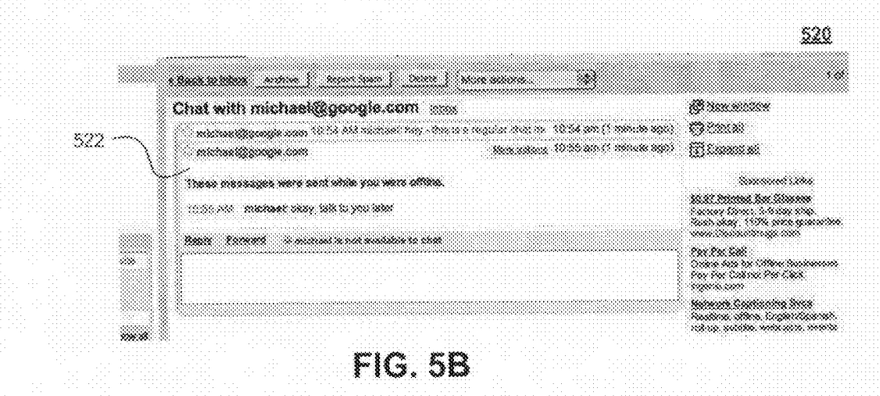
Figure 5C:
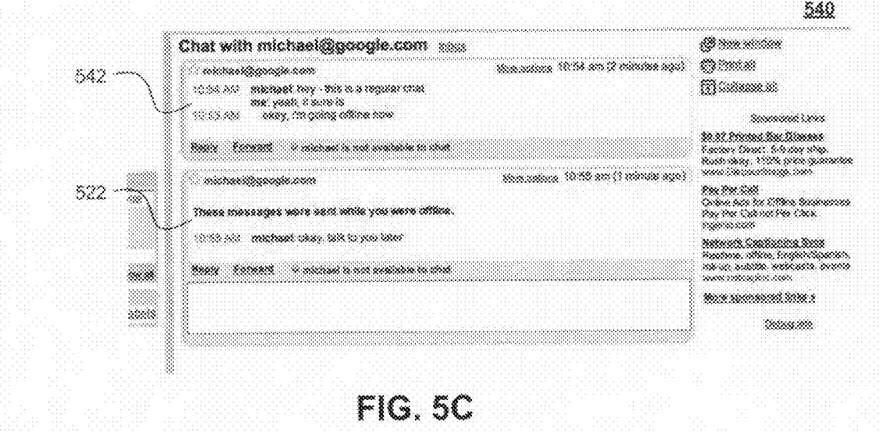

For example, user B may access his or her email inbox through the Gmail service provided by Google, Inc. of Mountain View, Calif. This example is illustrative and not intended to limit the present invention. Other email services can be used as would be apparent to a person skilled in the art given this description. FIGS. 5A-5C show exemplary screenshots depicting user B's email inbox, according to an embodiment of the present invention. FIG. 5A shows a screen shot 500 that depicts user B's email inbox as including an email thread 502. In an embodiment a thread is a collection of grouped messages. Moreover, as shown in FIG. 5A, thread 502 is presented with a bold font type indicating that the thread is unread or that email messages contained in thread 502 are unread. In alternate embodiments, threads or email messages that contain chat messages may be marked unread in other ways or may not be marked unread in email inbox 215.

FIG. 5B shows a screenshot 520 depicting user B's email inbox after user B selects thread 502. In particular, screenshot 520 shows a message 522 of thread 502 that includes a chat message received when user B was offline. As shown in FIG. 5B, email message 522 includes a textual identifier that indicates that the chat message was sent while user B was offline. In alternate embodiments, email message 522 may indicate that the chat message was received while user B is offline in other ways, or may not include such an indication. Moreover, as shown in FIG. 5B, email message 522 also includes a timestamp. The timestamp may indicate a time at which the chat message was transmitted by user A or received at receiving module 206. In an embodiment, email message 522 also includes other information (e.g., network address of user A, user name of user A, etc.).

FIG. 5C shows a screenshot 540 depicting user B's email inbox after thread 502 is fully opened. As shown in FIG. 5C, thread 502 includes a message 542 and message 522. Message 542 includes chat messages that were received while user B was online. Thus, a single email thread of user B may include messages that were received when user B was online and offline. Alternatively, online and offline message may be grouped into different email threads.

Furthermore, FIG. 5C shows that message that were received when the user was online and offline are separated into different emails. In an embodiment, an email may include both emails that are received when user B is online and offline.

In a further embodiment, user B may respond to message 522 or 524 through a chat message or an email message. For example, user B may respond to message 522 (i.e., the message that includes the offline chat message) with an email. Alternatively, user B may reply to message 522 with a chat message. If user A is online, the chat message may be received normally as a chat message. If user A is offline, the chat message may be accessed by user A through an associated email inbox.

As shown in FIGS. 5A-5C, user B is presented with two email messages. The first email message (i.e., message 522) includes a chat message received when user B was offline. The second email message (i.e., message 542) includes chat messages exchanged between user B and user A when user B was online. In the exemplary embodiment of method 300, the second email message may have first been generated in response to a first chat message exchanged between user A and user B. Thereafter, the second email message is held and additional chat messages are added to the second email message. When user B goes offline, the offline chat message is received and may determined not to be relevant and/or the second email message may no longer be held. Thus, the first email message is generated for the received offline chat message. Once the predefined period elapses or user B attempts to access his or her email inbox, the first email and the second email message may be transmitted to the email inbox. The second email message may be transmitted from a memory (e.g., memory 208 or memory 217) or a chat database (e.g., chat database 212) and may be used to provide context for the offline chat message contained in the first email message. When the first and second email messages are received at the email inbox, they may be determined to be relevant to each other and grouped in the same thread (i.e., thread 502). User B may then access both chat messages exchanged when user B is online and chat messages received when he or she is offline.

In the embodiment shown in FIG. 2, email module 214 and chat module 204 are coupled together through server 202. However, in alternate embodiments, chat module 204 and email module 214 may be independent. In such an embodiment, email module 214 may not be able to influence the operation of chat module 204 and/or chat module 204 may not be able to influence the operation of email module 214. Such embodiments may occur if, for example, the designated recipient is using a chat service provided by chat module 204 and server 202, but uses an email service provided by a server independent of server 202 (not shown in FIG. 2). In embodiments in which chat module 204 and email module 214 are independent, chat module 204 may not have a way of knowing whether the designated recipient has attempted to access an email inbox associated with him. In that case, chat module 204 may send the email message containing the received chat message to email module 214 as soon as the chat message is received or at a time thereafter without regard for when the designated recipient attempts to access the associated email inbox. Furthermore, the designated recipient may not be able to access chat database 212 through email module 214. In that case, email messages may be transmitted to email module 214 regardless of whether the chat message contained within email message was received when the designated recipient is online or offline.

Chat Message Content

In embodiments described above, a chat message has generally been described as including textual content. In alternate embodiments, a chat message may include other types of content. For example, a chat message may include images, audio content, video content, and/or multimedia content. A corresponding email message, e.g., an email that includes the chat message, may be configured to present the content in a manner similar to how the chat message would present the content. Alternatively, the corresponding email message may present the content according to protocols of an associated email service, e.g., the Gmail service provided by Google, Inc. of Mountain View, Calif.

For example, an offline chat message may include a voice mail message. In such an embodiment, the corresponding email message may be configured to allow the designated recipient to listen to the voice mail message as well as access other portions of the chat message, e.g., accompanying text, multimedia content, etc. A chat message may also include a link to textual content, images, audio content, video content, and/or multimedia content. An email message corresponding to such a chat message may display the link and/or present the content referenced by the link.

Furthermore, a chat message may also be used to transfer a file. An email message corresponding to a chat message that includes a request to transfer a file may be configured to allow the designated recipient to receive the file. In an embodiment, the file may be stored at a server, e.g., sever 202 in FIG. 2, and transmitted to the designated recipient when the designated recipient accesses the corresponding email message.

As would be apparent to those skilled in the relevant art(s), the corresponding email messages described above may refer to email messages corresponding to chat messages that are received when the designated recipient is online or offline.

Example

Figure 6:
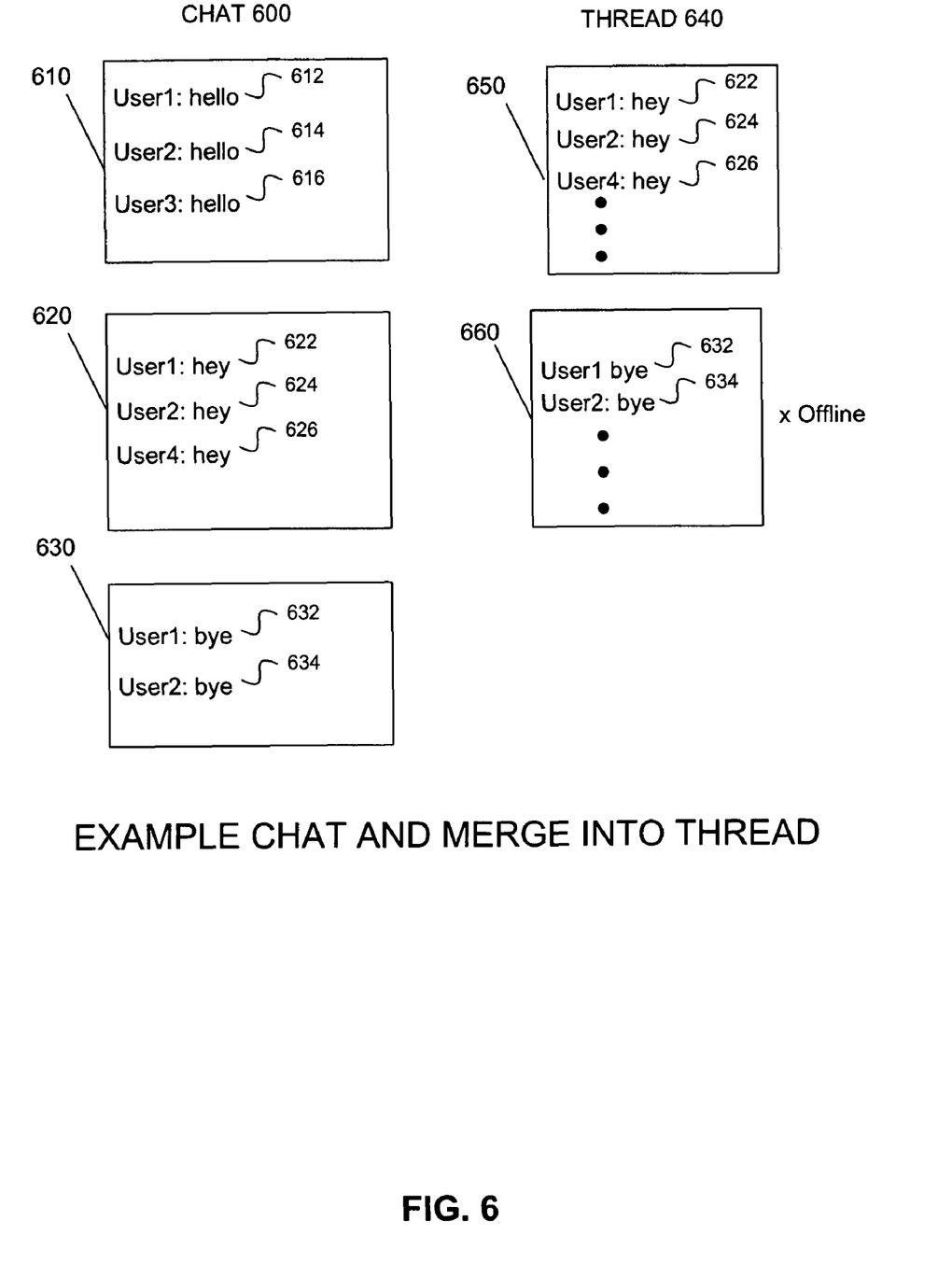
FIG. 6 is an illustration of an exemplary chat and an exemplary email thread according to an embodiment of the present invention.

FIG. 6 shows an exemplary chat 600 and an exemplary email thread 640, according to an embodiment of the present invention. Chat 600 includes a first instance 610, second instance 620, and a third instance 630. First instance 610 of chat 600 includes chat messages 612, 614, and 616 from a User1, a User2, and a User3, respectively. Second instance 620 includes chat messages 622, 624, and 626 from User1, User2, and a User4, respectively. Third instance 630 includes chat messages 632 and 634 from User1 and User2, respectively. In an embodiment, chat message 634 of third instance 630 is transmitted or received at a server when User1 is offline. According to an embodiment of the present invention, then, User1 may access information related to chat 600 through an email inbox associated with him or her.

In a further embodiment, thread 640 is an email thread stored in the email inbox associated with User1. Thread 640 includes a first message 650 and a second message 660 which can be a conversation including offline chat message(s). First message 650 includes chat messages 622, 624, and 626, from chat 600. Second message 660 includes chat messages 632 and 634 from chat 600. Through message 660, then, User1 can view offline chat message 634. Moreover, User1 may also view message 632 of instance 630 and messages 622, 624, and 626 of instance 620 through email messages 650 and 660. In alternate embodiments, thread 640 may include any combination of messages from chat 600.

Conclusion

While various embodiments of the present invention have been described above, it should be understood that they have been presented by way of example, and not limitation. It will be apparent to persons skilled in the relevant art(s) that various changes can be made therein without departing from the scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method of processing messages, comprising:
receiving, at least one server, a first chat message when a designated recipient is offline;
receiving, at the at least one server, a second chat message when the designated recipient is offline;
automatically generating, at the at least one server, an email message that includes the first chat message;
holding the email message in a memory;
adding, at the at least one server, the second chat message to the email message when a length of a time period between when the first chat message is received and when the second chat message is received is less than a predefined value and the designated recipient does not access the email inbox during the time period; and
enabling, at the at least one server, the designated recipient to access the email message through an email inbox associated with the designated recipient.

2. A method of processing messages, comprising:
receiving, at least one server, a chat message when a designated recipient is offline;
automatically generating, at the at least one server, a first email message that includes the chat message;
holding the email message in a memory;
enabling, at the at least one server, the designated recipient to access the email message through an email inbox associated with the designated recipient;
receiving, at the at least one server, a second chat message when the designated recipient is offline; and
automatically generating, at the at least one server, a second email message that includes the second chat message, wherein a length of a time period between when the first chat message is received and when the second chat message is received is larger than a predefined value, or the email inbox has been accessed by the designated recipient during the time period.

3. The method of claim 1, wherein the generated email message is marked unread in the email inbox.

4. The method of claim 3, wherein the chat message is included in a reply to a second email message.

5. The method of claim 4, wherein the first email message is grouped with email messages associated with the second email in the email inbox of the designated recipient.

6. The method of claim 1, further comprising:
determining that the designated recipient is offline if the designated recipient has logged off a chat service.

7. The method of claim 1, further comprising:
determining that the designated recipient is offline if the designated recipient is inactive.

8. The method of claim 1, further comprising:
determining that the designated recipient is offline if a network connection associated with the designated recipient has been terminated.

9. The method of claim 2, further comprising:
enabling a designated recipient to access the second email message through the email inbox.

10. The method of claim 9, further comprising grouping the second email message with the first email message in the inbox.

11. The method of claim 10, wherein the grouping further comprises associating first email message and the second email message with a conversation thread.

12. The method of claim 1, wherein generating the email message includes adding an identifier that identifies at least one of the first or second chat messages as an offline message.

13. The method of claim 1, wherein at least one of the first or second chat messages includes at least one of textual content, an image, audio content, video content, or multimedia content.

14. The method of claim 1, wherein at least one of the first or second chat messages includes a request to transfer a file, further comprising:
storing the file; and
enabling the designated recipient to receive the stored file.

15. A system for processing messages, comprising:
a memory hardware;
chat module configured to receive first and second chat messages; and
an email module configured to enable a designated recipient to access an email inbox;
wherein at least one of the chat module or the email module is configured:
to automatically generate an email message that includes the first chat message,
to hold the email message in the memory hardware; and
to add the second chat message to the email message when a length of a time period between when the first chat message is received and when the second chat message is received is less than a predefined value and the designated recipient does not access the email inbox during the time period;
wherein the email module is configured to enable the designated recipient to access the email message through the email inbox.

16. The system of claim 15, wherein the chat module is configured to transmit at least one of the first or second chat messages to the email module, wherein the email module is configured to generate the email message.

17. The system of claim 15, wherein the chat module is configured to generate the email message and to transmit the generated email message to the email module.

18. The system of claim 15, further comprising:
a database, wherein the email is transmitted from the memory hardware to the database when at least one of a predefined period has elapsed or the designated recipient attempts to access the email inbox.

19. The system of claim 15, wherein the chat module is coupled to a connection manager, wherein the chat module is configured to query the connection manager to determine if the designated recipient is offline.

20. A method of processing messages, comprising:
receiving, at least one server, first and second chat messages;
automatically generating, at the at least one server, an email message that includes the first chat message;
holding the email message in a memory;
adding, at the at least one server, the second chat message to the email message when a length of a time period between when the first chat message is received and when the second chat message is received is less than a predefined value and the designated recipient does not access the email inbox during the time period; and
enabling, at the at least one server, a designated recipient to view the generated email as an unread email in an email inbox of the designated recipient if the designated recipient is offline when the chat message is received.

* * * * *

UNITED STATES PATENT AND TRADEMARK OFFICE
CERTIFICATE OF CORRECTION

PATENT NO.        : 7,831,673 B1                                        Page 1 of 1
APPLICATION NO.   : 11/980548
DATED             : November 9, 2010
INVENTOR(S)       : David Cohen et al.

It is certified that error appears in the above-identified patent and that said Letters Patent is hereby corrected as shown below:

In column 12, line 34, replace "at least one server" with --at at least one server--.

In column 12, line 51, replace "at least one server" with --at at least one server--.

Signed and Sealed this
Twenty-second Day of March, 2011

David J. Kappos
*Director of the United States Patent and Trademark Office*